United States Patent
Rousseau et al.

(10) Patent No.: US 6,493,494 B1
(45) Date of Patent: Dec. 10, 2002

(54) DISPERSION COMPENSATING FIBER FOR WAVELENGTH DIVISION MULTIPLEXED OPTICAL FIBER TRANSMISSION SYSTEMS USING DISPERSION SHIFTED FIBER AS LINE FIBER

(75) Inventors: Jean-Claude Rousseau, Chatou; Marianne Paillot, Saint Brice Sous Foret, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/444,373

(22) Filed: Nov. 22, 1999

(30) Foreign Application Priority Data

Nov. 23, 1998 (FR) .............................................. 98 14705

(51) Int. Cl.[7] .............................. G02B 6/18; G02B 6/22
(52) U.S. Cl. ........................ 385/123; 385/124; 385/127
(58) Field of Search ................................ 385/123, 124, 385/126, 127

(56) References Cited

U.S. PATENT DOCUMENTS

| | | | |
|---|---|---|---|
| 5,361,319 A | 11/1994 | Antos et al. ................. | 385/123 |
| 5,448,674 A | * 9/1995 | Vensarkar et al. ........... | 385/123 |
| 5,568,583 A | 10/1996 | Akasaka et al. | |
| 5,742,723 A | * 4/1998 | Onishi et al. ............... | 385/127 |
| 5,781,673 A | * 7/1998 | Reed et al. .................... | 385/24 |
| 5,995,695 A | * 11/1999 | Aikawa et al. .............. | 385/123 |
| 5,999,679 A | * 12/1999 | Antos et al. ................. | 385/127 |

FOREIGN PATENT DOCUMENTS

| | | |
|---|---|---|
| EP | 0 598 554 A1 | 5/1994 |
| EP | 0 674 193 A2 | 9/1995 |
| JP | 08 313750 A | 11/1996 |

OTHER PUBLICATIONS

Onishi, M. et al.: "Third–Order Dispersion Compensating Fibres for Non–Zero Dispersion Shifted Fibre Links" Electronics Letters, vol. 32, No. 25, Dec. 5, 1996, p. 2344–2345, XP000685332 ISSN: 0013–5194.

* cited by examiner

*Primary Examiner*—Hemang Sanghavi
*Assistant Examiner*—Omar Rojas, Jr.
(74) *Attorney, Agent, or Firm*—Sughrue Mion, PLLC

(57) ABSTRACT

The invention concerns a monomode optical fiber having at a wavelength of 1550 nm a dispersion slope from −0.8 ps/nm$^2$.km to −0.5 ps/nm$^2$.km and a chromatic dispersion from −130 ps/nm.km to −90 ps/nm.km, the fiber having a cladding and a core whose index profile features a central part having an index higher than that of the cladding, a ring having an index higher than that of the cladding and lower than that of the central part, and a trench between the central part and the ring having an index lower than that of the cladding, and the use of a fiber of this kind to compensate dispersion. The fiber of the invention finds applications in high bit rate transmission systems in particular. The invention also concerns a wavelength division multiplex optical fiber transmission system comprising at least one section of fiber in accordance with the invention.

22 Claims, 1 Drawing Sheet

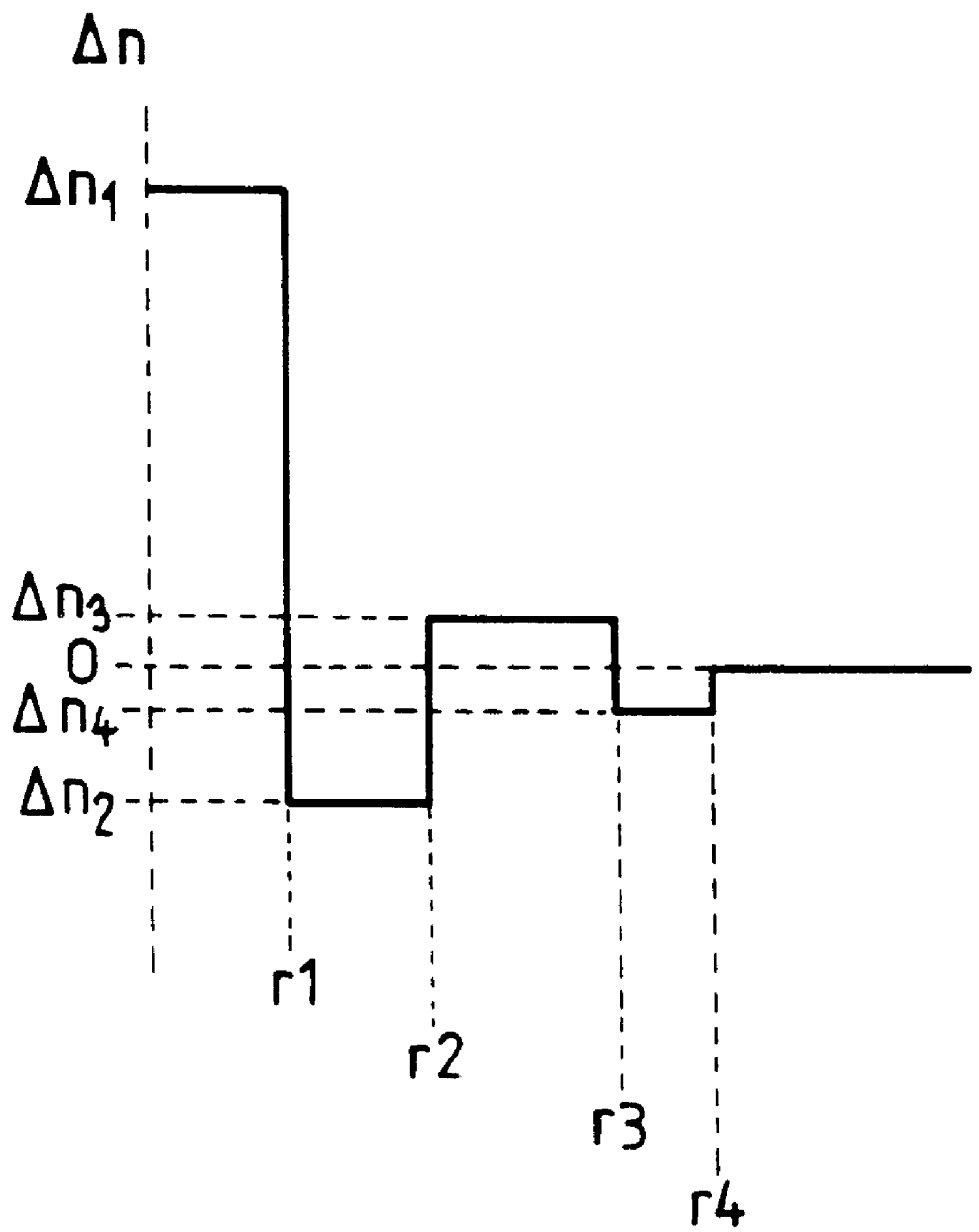

DISPERSION COMPENSATING FIBER FOR WAVELENGTH DIVISION MULTIPLEXED OPTICAL FIBER TRANSMISSION SYSTEMS USING DISPERSION SHIFTED FIBER AS LINE FIBER

BACKGROUND OF THE INVENTION

The present invention relates to monomode optical fibers which can be used in particular to compensate dispersion, and it also relates to optical fiber transmission and more particularly wavelength division multiplex transmission using dispersion shifted fiber as line fiber.

The refractive index profile of optical fibers is generally characterized as a function of the curve representing variations in the refractive index as a function of the radius of the fiber. It is conventional to plot on the abscissa axis the distance r to the center of the fiber and on the ordinate axis the refractive index defined in terms of its absolute or percentage difference from the index of the cladding of the fiber. The expressions "step profile", "trapezium profile" and "triangle profile" are used to refer to curves representative of the index variation as a function of the radius which respectively have step, trapezium and triangle shapes. These curves are generally representative of the theoretical profile or set point profile of the fiber and fiber fabrication constraints can yield a substantially different profile.

It is advantageous to manage chromatic dispersion in new high bit rate wavelength division multiplex (WDM) transmission networks, in particular for bit rates of 10 Gbit/s and above; the objective is to obtain substantially zero cumulative chromatic dispersion over the link for all wavelength values of the multiplex or comb, in order to limit widening of the pulses. A cumulative value of a few hundred ps/nm for the dispersion is acceptable. Increasing the unit bit rate of each channel makes it even more necessary to compensate cumulative chromatic dispersion.

Dispersion shifted fibers (DSF) are now commercially available. In these fibers the chromatic dispersion of the transmitted wave is substantially zero at the transmission wavelength at which they are used, which is generally different from the wavelength of 1.3 $\mu$m at which the dispersion of the silica is substantially zero; silica is compensated—hence the use of the term "shifted"—by an increase in the index difference $\Delta n$ between the fiber core and the optical cladding. This index difference shifts the wavelength of zero chromatic dispersion; it is obtained by introducing dopants into the preform during its fabrication, for example by an MCVD process well known in the art and not described in detail here. A typical value for the index difference between the cladding and the core of the fiber is $15 \times 10^{-3}$; the index of the silica can be increased by doping with geranium, for example. Non-zero dispersion shifted fibers (NZ-DSF) are dispersion shifted fibers which have non-zero chromatic dispersion outside the range of wavelengths used for transmission, typically outside the range of wavelengths from 1520 nm to 1580 nm.

It has been proposed to use dispersion compensating fiber (DCF) to correct the chromatic dispersion induced by a stepped index line fiber. For example, European Patent Application EP-A1-0 554 714 describes dispersion compensating fiber for standard line fibers having a stepped index profile and zero chromatic dispersion at around 1310 nm or flat dispersion fibers having two chromatic dispersion zeros between 1300 nm and 1600 nm. A fiber of this kind has a total dispersion less than −20 ps/nm-km at a given wavelength in the range from 1520 nm to 1565 nm and an attenuation of less than 1 dB/km. For example, the general shape of the profile of fiber of this kind has a narrow central part whose index is higher than that of the cladding, a ring with a higher index than the cladding and a lower index than the central part, and two trenches with the same index, one between said central part and the ring and one between the ring and the cladding. The second trench is optional.

However, when using these DCFs no allowance is made for chromatic dispersion or for the chromatic dispersion slope over the whole of the range of wavelengths concerned. Thus if it is required to compensate only chromatic dispersion, for example, without compensating the slope of said chromatic dispersion, drift occurs in the compensation and the system is not completely compensated at the output since the chromatic dispersion slope is insufficiently compensated. Steps must be taken at the output so that at this end all the wavelengths have the same chromatic dispersion, since otherwise it is necessary to compensate length by length, which quickly becomes prohibitive from both the technical and cost points of view. Accordingly, in this case, it is then necessary to use a greater length of DCF, which induces greater chromatic dispersion and leads to a higher cost.

SUMMARY OF THE INVENTION

The fiber of the invention aims to solve this problem of the prior art by enabling correct compensation not only of the cumulative dispersion in the line fiber but also of the dispersion slope. It assures good wavelength division multiplex transmission without inducing high levels of attenuation and it limits non-linear effects. The invention applies in particular to transmission systems using NZ-DSF fibers with RZ, NRZ or soliton pulses.

To be more precise, the invention proposes a monomode optical fiber having at a wavelength of 1550 nm a dispersion slope from −0.8 ps/nm².km to −0.5 ps/nm².km and a chromatic dispersion from −130 ps/nm.km to −90 ps/nm.km, the fiber having a cladding and a core whose index profile features a central part having an index higher than that of the cladding, a ring having an index higher than that of the cladding and lower than that of the central part, and a trench between the central part and the ring having an index lower than that of the cladding.

The line fiber advantageously has no zero value of chromatic dispersion in the range of wavelengths of the multiplex.

Another advantage of the fiber of the invention is that when it is used to compensate the chromatic dispersion of a line fiber the ratio between the chromatic dispersion and the chromatic dispersion slope can be of the same order of magnitude as the same ratio for the line fiber.

In particular, the fiber of the invention generally enables the use of dispersion compensating fiber less than one-tenth the length of the line fiber and preferably less than one-twentieth said length.

The fiber of the invention preferably has a chromatic dispersion slope from −0.7 ps/nm².km to −0.6 ps/nm².km at a wavelength of 1550 nm.

The dispersion compensating fiber advantageously has a chromatic dispersion close to −100 ps/nm.km at a wavelength of 1550 nm.

The difference ($\Delta n_1$) between the index of the central part of the core and the index of the cladding can be from $20 \times 10^{-3}$ to $30 \times 10^{-3}$ and is preferably around $25 \times 10^{-3}$.

The central part of the core advantageously extends out to a radius ($r_1$) from 1.15 μm to 1.25 μm and preferably around 1.2 μm.

The difference ($\Delta n_3$) between the index of the ring of the core and the index of the cladding can be from $0.5 \times 10^{-3}$ to $1.5 \times 10^{-3}$ and is preferably around $1 \times 10^{-3}$.

The ring advantageously has a thickness ($r_3 - r_2$) from 3.5 times to 4.5 times the radius ($r_1$) of the central part and preferably around four times that radius.

The difference ($\Delta n_2$) between the index of the trench between the central part and the ring and the index of the cladding can be from $-4.5 \times 10^{-3}$ to $-5.5 \times 10^{-3}$ and is preferably around $-5 \times 10^{-3}$.

The trench between the central part and the ring advantageously has a thickness ($r_2 - r_1$) from 2.5 times to 3.5 times the radius ($r_1$) of the central part and preferably around 3 times that radius.

In one preferred embodiment of the invention the index profile preferably has a trench with an index less than that of the cladding between the ring and the cladding.

The difference ($\Delta n_4$) between the index of the trench between the ring and the cladding and the index of the cladding can be from $-0.1 \times 10^{-3}$ to $-0.5 \times 10^{-3}$ and is preferably around $-0.3 \times 10^{-3}$.

The trench between the ring and the cladding advantageously has a thickness ($r_4 - r_3$) from 0.8 times to 1.2 times the radius ($r_1$) of the central part and preferably approximately equal to that radius.

The invention also concerns the use of a monomode optical fiber of the invention to compensate dispersion.

Finally, the invention concerns a wavelength division multiplex optical fiber transmission system comprising at least one monomode dispersion shifted line fiber section and at least one monomode dispersion compensating fiber section in accordance with the invention.

In one embodiment of the invention, the line fiber has a chromatic dispersion at 1550 nm from 2 ps/nm.km to 6 ps/nm.km and preferably around 4 ps/nm.km.

In another embodiment of the invention, the line fiber has a chromatic dispersion slope at 1550 nm from 0.06 ps/nm².km to 0.08 ps/nm².km and preferably in the order of 0.075 ps/nm².km.

BRIEF DESCRIPTION OF THE DRAWINGS

Other features and advantages of the invention will become apparent on reading the following description of particular embodiments of the invention which is given by way of example only and with reference to the accompanying drawing, in which the single FIGURE shows the index profile of a dispersion compensating fiber in accordance with the invention.

DETAILED DESCRIPTION OF THE INVENTION

The invention proposes a new monomode optical fiber particularly suitable for compensating dispersion, generally intended to be used in a wavelength division multiplex transmission system using DSF or preferably NZ-DSF as the line fiber.

An NZ-DSF typically has the following specifications:
a dispersion at 1550 nm from 2 ps/nm.km to 6 ps/nm.km, for example in the order of 4 ps/nm.km,
a dispersion slope at 1550 nm from 0.06 ps/nm².km to 0.08 ps/nm².km, for example in the order of 0.075 ps/nm².km, and a chromatic dispersion cancellation wavelength $\lambda_0$ outside the range of a wavelength division multiplex, i.e. outside a range from 1520 nm to 1580 nm. This produces sufficiently high dispersion in the range of the multiplex to limit non-linear effects such as four-wave mixing.

The fiber of the invention can be used to compensate dispersion in a wavelength division multiplex transmission system using NZ-DSF as the line fiber. It is particularly suitable for high bit rate systems, i.e. systems operating at bit rates greater than 10 Gbit/s. It assures that the cumulative dispersion over a link remains below 1000 ps.

The fiber of the invention is a monomode optical fiber which has a dispersion slope from −0.8 ps/nm².km to −0.5 ps/nm².km and a chromatic dispersion from −130 ps/nm.km to −90 ps/nm.km at a wavelength of 1550 nm. As the examples given below indicate, these values are suitable for compensating chromatic dispersion in a WDM system using NZ-DSF as the line fiber.

The value of the chromatic dispersion slope is chosen to compensate at the same time the chromatic dispersion slope of a dispersion shifted fiber and the chromatic dispersion of the fiber. A value less than −0.6 ps/nm².km is appropriate. This value is superior in absolute terms to the value of the dispersion slope for a conventional dispersion compensating fiber.

The single figure shows one example of the index profile of a fiber in accordance with the invention. The fiber has a core with a rectangular central part having an index $n_1$ which is substantially constant and greater than that $n_c$ of the cladding at radii less than $r_1$. The difference $\Delta n_1$ between the index $n_1$ and the index $n_c$ of the cladding is $25 \times 10^{-3}$ in the example shown in the figure. A value between $20 \times 10^{-3}$ and $30 \times 10^{-3}$ is appropriate. In the example, the radius $r_1$ is 1.2 μm. Said radius $r_1$ is usually in the range from 1.15 μm to 1.25 μm.

Around this central part, the fiber has a ring between the radii $r_2$ and $r_3$ which has an index $n_3$ higher than that of the cladding and lower than that of the central part of the core. In the embodiment shown in the figure, the difference $\Delta n_3$ between the index of the ring and the index of the cladding is $1 \times 10^{-3}$. It is advantageously from $0.5 \times 10^{-3}$ to $1.5 \times 10^{-3}$. The ring has a thickness ($r_3 - r_2$) close to 4 times the radius $r_1$ of the central part of the core. According to the invention, the thickness ($r_3 - r_2$) can vary from 3.5 times to 4.5 times the radius $r_1$.

Between the radii $r_1$ and $r_2$ the ring is separated from the core by a trench having an index less than that of the cladding; an index difference $\Delta n_2$ relative to the index of the cladding in the order of $-5 \times 10^{-3}$ is appropriate. More generally, an index difference in the range from $-4.5 \times 10^{-3}$ to $-5.5 \times 10^{-3}$ is suitable. The thickness ($r_2 - r_1$) of the trench is in the order of 3 times the radius $r_1$ of the central part of the core. A thickness ($r_2 - r_1$) of the trench in the range from 2.5 times to 3.5 times the radius $r_1$ of the central part would be suitable.

The fiber has a trench between the ring and the cladding with an index lower than that of the cladding. In the embodiment shown in the figure, the trench has an index difference $\Delta n_4$ of $-0.3 \times 10^{-3}$ relative to the index of the cladding and a thickness ($r_4 - r_3$) in the order of the radius $r_1$ of the central part of the core. Values of the index difference $\Delta n_4$ in the range from $-0.1 \times 10^{-3}$ to $-0.5 \times 10^{-3}$ and values of the thickness ($r_4 - r_3$) in the range from 0.8 times to 1.2 times the radius $r_1$ of the central part would be suitable. The provision of this trench in the vicinity of the cladding is dependent on the method of fabricating the fiber, and the trench could be dispensed with.

The index profile shown in the figure yields the dispersion and dispersion slope values mentioned in the remainder of the description.

An example will now be described of using the fiber of the invention to compensate dispersion in a wavelength division multiplex transmission system using NZ-DSF as the line fiber. In this example, the transmission system comprises dispersion shifted line fiber sections which at 1550 nm have a chromatic dispersion in the order of +4 ps/nm.km and a chromatic dispersion slope at the same wavelength of 0.075 ps/nm².km. A fiber of the type described in U.S. Pat. No. 4,715,679 can be used for this. 80 km line fiber sections are used.

3.5 km long sections of dispersion compensating fiber in accordance with the invention are interleaved with the line fiber sections and have a dispersion in the order of −128 ps/nm.km and a dispersion slope in the order of −0.7 ps/nm².km at 1550 nm.

In this case, after 83.5 km of propagation, the following chromatic dispersion values (CD, expressed in ps/nm.km) and chromatic dispersion slope values (CD slope, expressed in ps/nm².km) are obtained for various values of the wavelength:

| at 1525 nm: | |
| --- | --- |
| line DSF: | +2.12 |
| DCF: | −112 |
| resultant CD of both fibers: | −2.7 |
| resultant CD slope of both fibers: | +0.045 |
| at 1550 nm: | |
| line DSF: | +4 |
| DCF: | −128 |
| resultant CD of both fibers: | −1.53 |
| resultant CD slope of both fibers: | +0.04 |
| at 1575 nm: | |
| line DSF: | +5.87 |
| DCF: | −148 |
| resultant CD of both fibers: | −0.57 |
| resultant CD slope of both fibers: | +0.035 |
| at 1600 nm: | |
| line DSF: | +7.75 |
| DCF: | −170 |
| resultant CD of both fibers: | +0.3 |
| resultant CD slope of both fibers: | +0.03 |

This example shows that the fiber of the invention can be used to compensate chromatic dispersion in the transmission system. The invention can also maintain a low resultant attenuation, in particular because of the short length of dispersion compensating fiber used.

The skilled person can easily fabricate fibers for use in accordance with the invention using prior art techniques such as MCVD or other techniques routinely used in the fabrication of optical fibers.

Of course, the invention is not limited to the embodiments described. In particular, fiber profiles other than that shown in the figure can be used to obtain a fiber for compensating a WDM system using DSF or NZ-DSF as the line fiber.

What is claimed is:

1. A monomode optical fiber having at a wavelength of 1550 nm a dispersion slope from −0.8 ps/nm².km to −0.5 ps/nm².km and a chromatic dispersion from −130 ps/nm.km to −90 ps/nm.km, the fiber having a cladding and a core whose index profile features a central part having an index higher than that of the cladding, a ring having an index higher than that of the cladding and lower than that of the central part, and a trench between the central part and the ring having an index lower than that of the cladding.

2. A fiber according to claim 1 having at a wavelength of 1550 nm a chromatic dispersion slope from −0.7 ps/nm².km to −0.6 ps/nm².km.

3. A fiber according to claim 1 having at a wavelength of 1550 nm a chromatic dispersion of around −100 ps/nm.km.

4. A fiber according to claim 1, wherein the difference ($\Delta n_1$) between the index of the central part of the core and the index of the cladding is from $20 \times 10^{-3}$ to $30 \times 10^{-3}$.

5. A fiber according to claim 4, wherein the difference ($\Delta n_1$) between the index of the central part of the core and the index of the cladding is around $25 \times 10^{-3}$.

6. A fiber according to claim 1, wherein the central part of the core extends out to a radius ($r_1$) from 1.15 μm to 1.25 μm.

7. A fiber according to claim 6, wherein the central part of the core extends out to a radius ($r_1$) of around 1.2 μm.

8. A fiber according to claim 4, wherein the difference ($\Delta n_3$) between the index of the ring of the core and the index of the cladding is from $0.5 \times 10^{-3}$ to $1.5 \times 10^{-3}$.

9. A fiber according to claim 8, wherein the difference ($\Delta n_3$) between the index of the ring of the core and the index of the cladding is around $1 \times 10^{-3}$.

10. A fiber according to claim 4, wherein the ring has a thickness ($r_3 - r_2$) from 3.5 times to 4.5 times the radius ($r_1$) of the central part.

11. A fiber according to claim 10, wherein the ring has a thickness ($r_3 - r_2$) close to 4 times the radius ($r_1$) of the central part.

12. A fiber according to claim 4, wherein the difference ($\Delta n_2$) between the index of the trench between the central part and the ring and the index of the cladding is from $-4.5 \times 10^{-3}$ to $-5.5 \times 10^{-3}$.

13. A fiber according to claim 12, wherein the difference ($\Delta n_2$) between the index of the trench between the central part and the ring and the index of the cladding is around $-5 \times 10^{-3}$.

14. A fiber according to claim 4, wherein the trench between the central part and the ring has a thickness ($r_2 - r_1$) from 2.5 times to 3.5 times the radius ($r_1$) of the central part.

15. A fiber according to claim 14, wherein the trench between the central part and the ring has a thickness ($r_2 - r_1$) close to 3 times the radius ($r_1$) of the central part.

16. A fiber according to claim 1, wherein the index profile features a trench between the ring and the cladding whose index is lower than that of the cladding.

17. A fiber according to claim 16, wherein the difference ($\Delta n_4$) between the index of the trench between the ring and the cladding and the index of the cladding is from $-0.1 \times 10^{-3}$ to $-0.5 \times 10^{-3}$.

18. A fiber according to claim 17, wherein the difference ($\Delta n_4$) between the index of the trench between the ring and the cladding and the index of the cladding is around $-0.3 \times 10^{-3}$.

19. A fiber according to claim 16, wherein the trench between the ring and the cladding has a thickness ($r_4 - r_3$) from 0.8 times to 1.2 times the radius ($r_1$) of the central part.

20. A fiber according to claim 19, wherein the trench between the ring and the cladding has a thickness ($r_4 - r_3$) close to the radius ($r_1$) of the central part.

21. The use of a monomode optical fiber according to claim 1 to compensate dispersion.

22. A wavelength division multiplex optical fiber transmission system comprising at least one monomode dispersion shifted fiber section and at least one monomode dispersion compensating fiber section according to claim 1.

* * * * *